March 18, 1958 — G. E. STUMPP — 2,827,203
MOTH KILLING DEVICE
Filed Oct. 7, 1953 — 2 Sheets-Sheet 1
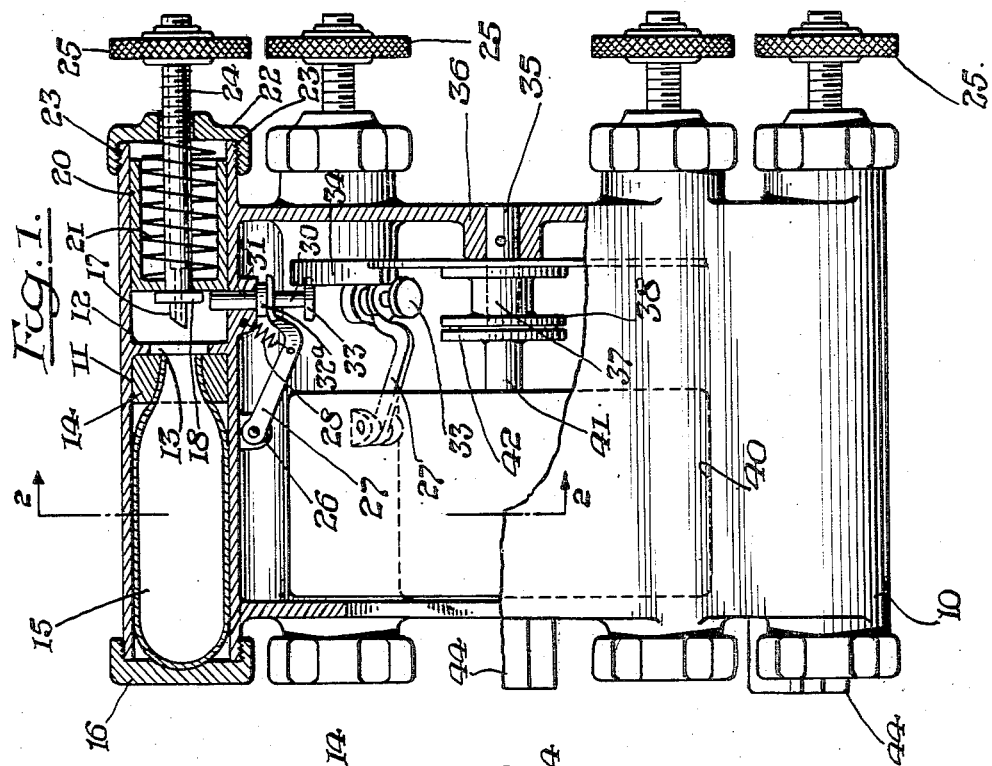
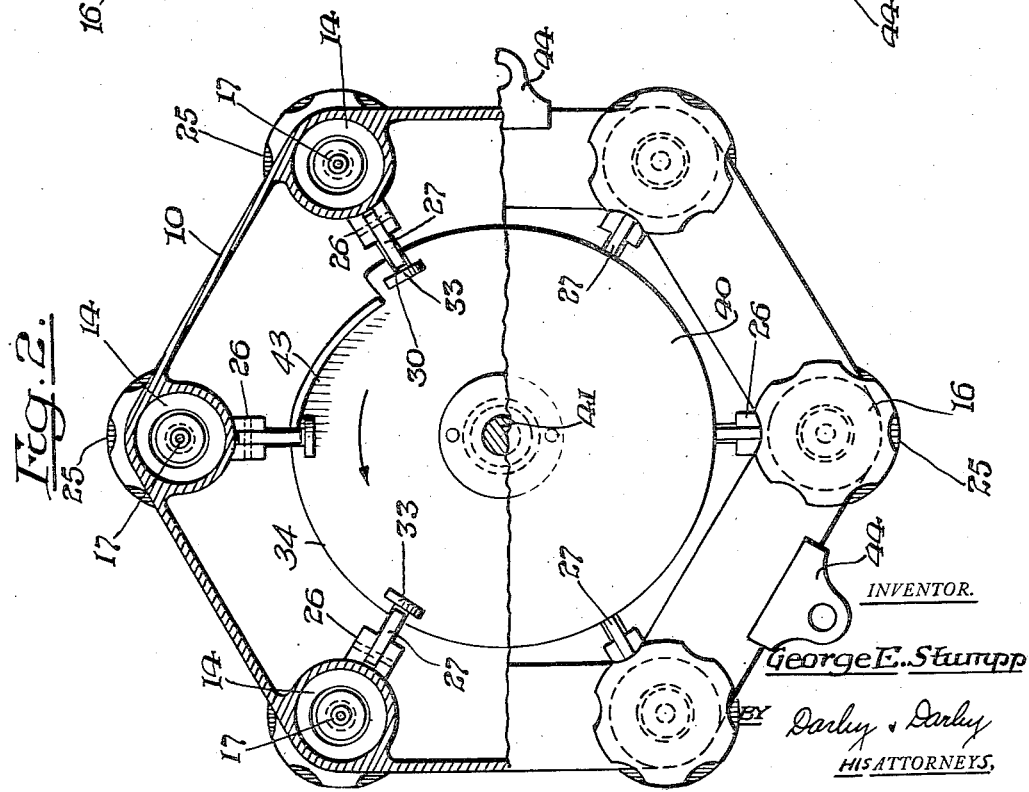
INVENTOR.
George E. Stumpp
BY Darby & Darby
HIS ATTORNEYS.

March 18, 1958 G. E. STUMPP 2,827,203
MOTH KILLING DEVICE
Filed Oct. 7, 1953 2 Sheets-Sheet 2
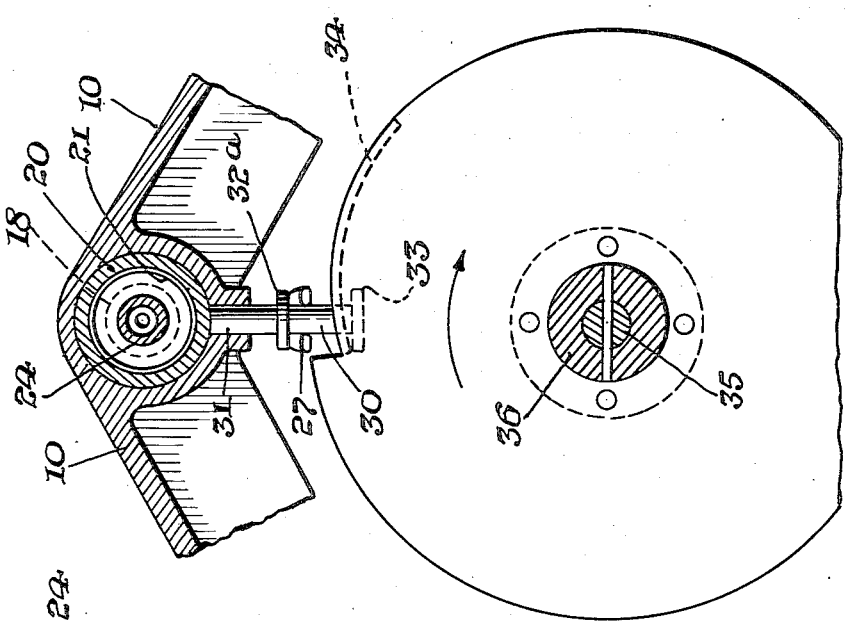
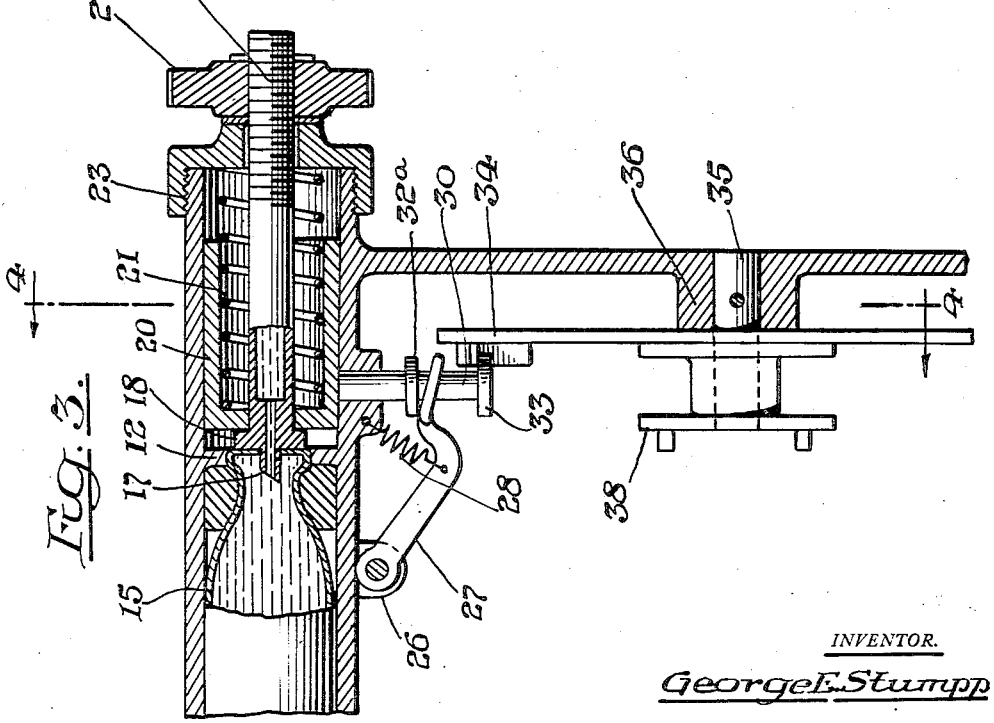
INVENTOR.
George E. Stumpp
BY Darby & Darby
HIS ATTORNEYS.

United States Patent Office 2,827,203
Patented Mar. 18, 1958

2,827,203

MOTH KILLING DEVICE

George E. Stumpp, Mineola, N. Y., assignor to Robert N. Rose, Mineola, N. Y.

Application October 7, 1953, Serial No. 384,598

6 Claims. (Cl. 222—70)

The present invention relates to moth killing devices and particularly to a device which emits a gas or vapor which kills both moths and moth larvae.

More particularly still the invention relates to that type of device which is intended to be placed in a clothes closet or other enclosure in which clothing is kept in order to kill any moths or moth larvae which may be present therein and thus to prevent damage to the clothing.

Many types of moth killing device have been utilized in the situation mentioned above, but most of these devices have the disadvantage that the protection against moth damage afforded thereby exists for a limited period of time only. The present device is intended for utilization in clothing closets or the like but is arranged so that moth killing gas or vapor is emitted periodically over a long period of time.

It is an object of the invention to provide a device for killing moth and moth larvae which is effective for a relatively long period of time.

It is another object of the invention to provide such a device which automatically emits gas or vapor to destroy moths and moth larvae at periodic intervals.

It is a further object of the invention to provide such a device as mentioned above which utilizes gas under pressure in cartridges which cartridges are readily replaced after the contents thereof have been discharged.

It is a further object of the invention to provide such a device wherein the sequential discharge of gas from the various cartridges incorporated therein is governed by a clock mechanism which may be either spring or electrically driven or driven by a combination of such means.

It is a still further object of the invention to provide such a moth damage preventing mechanism which is simply constructed and economically manufactured.

Other objects and features of the invention will be apparent when the following description is considered in connection with the annexed drawings, in which, Figure 1 is a side elevation, partially in section, of a moth killing device in accordance with my invention;

Figure 2 is a rear elevation of the device of the Figure 1, the upper half of the view being in section, the section being taken along the plane of the line 2—2 of Figure 1, the cartridges being omitted for clarity;

Figure 3 is a fragmentary cross-sectional view similar to the view of Figure 1 but showing certain of the parts in their operated position; and Figure 4 is a vertical cross-section taken on the plane of the line 4—4 of Figure 3.

Referring now to the drawings, there is shown at 10 a casing which is generally hexagonal in form and which is provided at each of its corners with a cylindrical cavity 11 each cavity being divided into two parts by means of the central partition 12 which partition has an opening 13 therein for purposes which will be hereinafter mentioned. Seated against each partition 12 is a compressible washer 14 against which the neck portion of a gas cartridge 15 may be placed. The cartridges 15 are held in their respective cylinders 11 by means of threaded caps 16 which screw on to the projecting end of cylinders 11 and bear against the ends of the cartridges 15.

At the opposite end of each cylinder 11 there is a hollow pin 17 which has formed integrally therewith a washer 18. Bearing against washer 18 is a cup shaped member 20 within which is a spring 21 the right hand end of which bears against a cap 22. Cap 22 is threadedly mounted as indicated at 23 on the right hand projecting end of cylinder 11 and thus spring 21 urges pin 17 to the left as seen in Figure 1. Pin 17 is formed with a thread 24 on its exterior surface for a portion of its length and a knurled knob 25 is threadedly mounted on the threaded portion 24. As will readily be seen by reference to Figure 1 rotation of the knob 25 will cause movement of plunger 17 to the right as soon as knob 25 bears against the outer surface of cap 22 and will thus compress the spring 21.

Mounted on the wall of each cylinder 11 closest to the center of the housing 10 is a bracket 26 on which is pivotally mounted a lever 27 urged to a locking position by means of a spring 28. Lever 27 is forked at the end opposite its pivot 26, the fork straddling a locking pin 30 which pin passes through a bore 31 in the cylinder 11 and extends sufficiently far inside the casing to prevent movement of plunger 17 to the left under urge of spring 21.

Pin 30 is provided with an integral washer or enlarged portion 32 thereon against which the fork portion operates. Pin 30 is also provided with a head 33 which head cooperates with a cam 34.

Cam 34 is a generally disk-shaped member and is rotatably mounted on a shaft 35 fixed in the boss 36 of the housing 10. Formed integrally with cam 34 is a hub 37 and clutch member 38. Mounted in the housing 10 in any suitable manner is a clock mechanism 40 which is provided with suitable gearing so that the shaft 41 thereof rotates through a complete revolution in a period of six months or other desired interval. Shaft 41 is provided with a clutch member 42 which mates with the clutch member 38 and the clock mechanism 40 is of course suitably fixed to the housing 10 to accomplish this result.

In use, the device is mounted within a closet or other enclosure in any suitable manner as by use of mounting ears 44, and a cartridge 15 placed in the left hand chamber of each of the various cylinders 11. In the particular instance illustrated there are six of these cartridges and the device is intended to operate in such a manner that one cartridge is discharged each month for six months, the clock mechanism, whether spring or electrically driven, being suitably geared down so that the shaft 41 makes a complete revolution in the six months' period.

Prior to inserting the cartridges 15 the operating knobs 25 are rotated to retract the plungers 17 and compress springs 21. When a member 20 has moved to the right sufficiently, latch pins 30 move radially outwardly and project into the cylinders thereby locking the plungers in their right hand positions. Subsequent to this locking action the operating knobs 25 are rotated in the reverse direction so that the plungers can move to the left without interference when the cam actuates the corresponding latch pin.

Cam member 34 is provided with a sloping portion which is bent up from the rim thereof and designated 43 in the drawings and, as the cam rotates in a counter-clockwise direction (as seen in Figure 2) the portion 43 will cause radially inward movement of the cooperating pin 30, which will then be removed from the path of the corresponding member 20 permitting the plunger to move to the left under urge of the spring 21, pass through opening 13 and penetrate the frangible end closure of the corresponding cartridge 15. As a result the gas which was under pressure in cartridge 15 will discharge through the hollow plunger 17 and will fill the closet or other enclosure. The remaining cartridges will be similarly penetrated at desired intervals so that there will be periodic discharge of moth killing gases or vapors into the enclosed space in which the device is mounted.

The particular insecticide used is of course unimportant it being only important that such insecticide be under pressure so that it will discharge from the cartridges when these cartridges are penetrated. An example of an insecticide which may be utilized is a pressurized vehicle of the Aerosol type carrying DDT as the active insecticide.

Although the foregoing description has specifically mentioned six pressurized cartridges of insecticide and a control clock and cam mechanism arranged to cause the discharge of the contents of one of the cartridges each mouth during a six months' period, it will be obvious that the number of cartridges and the time interval between discharge thereof may be varied within wide limits, and that the details of the mechanisms to accomplish such discharge may be considerably varied.

I wish therefore to be limited not by the foregoing description, but on the contrary only by the claims granted to me.

What is claimed is:

1. In a moth killing device, in combination, a plurality of tubular members arranged in angular spaced relationship about a central axis, the axes of said tubular members being parallel to the said central axis, a partition wall dividing each tubular member into two portions, means for holding a cartridge of pressurized insecticide in one of said portions, a hollow plunger mounted in the other of said portions, spring means bearing against each said plunger and urging it into penetrating engagement with the corresponding cartridge, latching means mounted on the exterior wall of each said tubular member, each said latching means having a portion projecting through the said wall and preventing movement of said plunger toward cartridge penetrating position, means for urging said latching means to latching position and timing means for operating said latching means to release said hollow plungers.

2. A device as claimed in claim 1, characterized in that each said hollow plunger has an exterior thread at the end thereof remote from said cartridge and further characterized in that said threaded portion is engaged by a threaded knob whereby operation of said knob moves said plunger away from said penetrating position against the urge of said spring to thereby reset said device.

3. A device as claimed in claim 1, wherein each said latching means terminates in a headed portion at the end radially inward from its corresponding tubular member, and said timing means comprises a cam rotating in a circular path concentric with said central axis of said members, said cam having an arcuate rim portion extending in the path of said heads whereby as said cam revolves said latching means are sequentially urged to unlatching position.

4. In a moth killing device, in combination, a housing generally hexagonal in shape, cylindrical cavities formed in said housing, each said cavity extending parallel to the axis of said housing at the angle of said hexagonal housing, a partition wall dividing each cylindrical cavity into two portions, means for holding a cartridge of pressurized insecticide in one portion of each said cavity, a hollow plunger mounted in the other portion of said cavity in axial alignment with said cartridge, a spring bearing against said plunger and urging it into penetrating engagement with said cartridge, a latching means mounted on the exterior wall of each said cylindrical cavity, each said latching means having a portion projecting through the said wall and preventing movement of said hollow plunger, means resiliently urging said latching means to latching position and timing means for operating said latching members against the urge of said resilient means to thereby release said hollow plungers.

5. A device as claimed in claim 4, characterized in that each said hollow plunger has an exterior thread at the end thereof remote from said cartridge, said exteriorly threaded portion being engaged by a threaded knob bearing against a fixed portion of said housing whereby operation of said knob moves said plunger from penetrating position against the urge of said spring to thereby reset said device.

6. A device as claimed in claim 4, wherein each said latching means terminates at the end radially inward from said cylindrical cavities in a head and further characterized in that said timing means comprises a cam having an arcuate rim portion extending in the path of said heads whereby as said cam revolves said latching means are sequentially urged to unlatching position.

References Cited in the file of this patent

UNITED STATES PATENTS

| 1,671,369 | Johann | May 29, 1928 |
| 2,252,125 | Hauser | Aug. 12, 1941 |
| 2,672,705 | Benzie | Mar. 23, 1954 |